United States Patent
Marino et al.

(10) Patent No.: US 8,423,724 B2
(45) Date of Patent: Apr. 16, 2013

(54) DYNAMIC BACK-UP STORAGE SYSTEM WITH RAPID RESTORE AND METHOD OF OPERATION THEREOF

(75) Inventors: Kelvin Marino, Laguna Hills, CA (US); Michael Rubino, San Jose, CA (US); Mike H. Amidi, Lake Forest, CA (US)

(73) Assignee: SMART Modular Technologies, Inc., Newark, CA (US)

( * ) Notice: Subject to any disclaimer, the term of this patent is extended or adjusted under 35 U.S.C. 154(b) by 289 days.

(21) Appl. No.: 12/878,008

(22) Filed: Sep. 8, 2010

(65) Prior Publication Data

US 2012/0060009 A1  Mar. 8, 2012

(51) Int. Cl.
*G06F 13/16* (2006.01)
*G06F 12/06* (2006.01)

(52) U.S. Cl.
USPC .... 711/150; 711/152; 711/163; 711/E12.083; 714/6.2; 714/24

(58) Field of Classification Search .................. 711/150, 711/152, 163, E12.083, E12.098; 714/6.2, 714/24
See application file for complete search history.

(56) References Cited

U.S. PATENT DOCUMENTS

| | | | |
|---|---|---|---|
| 5,197,026 A | 3/1993 | Butler | |
| 6,336,174 B1 | 1/2002 | Li et al. | |
| 2005/0027952 A1* | 2/2005 | Mayo et al. | 711/158 |
| 2007/0101077 A1* | 5/2007 | Evanchik et al. | 711/162 |
| 2008/0178025 A1* | 7/2008 | Hand et al. | 713/323 |
| 2009/0113558 A1* | 4/2009 | Prabhakaran et al. | 726/27 |
| 2009/0172270 A1* | 7/2009 | Kardach et al. | 711/105 |
| 2009/0210691 A1* | 8/2009 | Im et al. | 713/2 |
| 2009/0313416 A1 | 12/2009 | Nation | |
| 2010/0008175 A1 | 1/2010 | Sweere et al. | |
| 2010/0268869 A1* | 10/2010 | Roh et al. | 711/103 |
| 2012/0060009 A1* | 3/2012 | Marino et al. | 711/165 |

* cited by examiner

*Primary Examiner* — Hal Schnee
(74) *Attorney, Agent, or Firm* — Ishimaru & Associates LLP

(57) ABSTRACT

A method for operating a dynamic back-up storage system includes: providing a high speed memory including a first rank memory device and subsequent ranks of memory devices; providing a non-volatile memory for saving data from the high speed memory; and providing a control logic unit for controlling access, of a central processing unit that executes a program, from the high speed memory including restoring the subsequent ranks of memory devices while the central processing unit is executing the program from the first rank memory device.

20 Claims, 5 Drawing Sheets

DYNAMIC BACK-UP STORAGE SYSTEM WITH RAPID RESTORE AND METHOD OF OPERATION THEREOF

TECHNICAL FIELD

The present invention relates generally to a dynamic back-up storage system, and more particularly to a system for dynamic back-up of memory data with rapid restore support.

BACKGROUND ART

Contemporary high performance computing main memory systems are generally composed of one or more memory devices, such as dual in-line memory modules (DIMMs), which are connected to one or more memory controllers and/or processors. The DIMMs may be connected via one or more memory interface elements such as buffers, hubs, bus-to-bus converters, etc. The memory devices are generally located in a memory subsystem and are often connected via a pluggable interconnection system by one or more connectors to a system board, such as a PC motherboard.

Overall computer system performance is affected by each of the key elements of the computer structure, including the performance/structure of the processor, any memory caches, the input/output (I/O) subsystem, the efficiency of the memory control functions, the performance of the main memory devices, any associated memory interface elements, and the type and structure of the memory interconnect interface.

Extensive research and development efforts are invested by the industry, on an ongoing basis, to create improved and/or innovative solutions to maximizing overall system performance and density by improving the memory system design. High-availability systems present further challenges as related to overall system reliability due to customer expectations that new computer systems will markedly surpass existing systems in regard to mean-time-between-failure (MTBF), in addition to offering additional functions, increased performance, increased storage, lower operating costs, etc.

Some vital computer applications rely on data integrity and go to extreme lengths to protect the data from unexpected faults, such as power failures. Most storage systems make some provision for storing pending data in the event of a power failure, but most are on a best effort basis and rely on transient energy sources to preserve as much data as possible before the energy runs out. In disk drives for instance, the spinning media becomes a source of energy utilized to store any residual unwritten data.

Data that may not have been transferred from system memory to a peripheral storage system may be at a greater risk. In applications that rely on data integrity other accommodations must be made at the system level. A standard approach to preserving system operation is a battery back-up structure, but this approach consumes significant space and may only be a short term solution. Beyond the duration of the battery back-up system, the critical data would be lost.

Other frequent customer requirements further exacerbate the memory system design challenges, and include such items as ease of upgrade and reduced system environmental impact (such as space, power and cooling). In addition, customers are requiring the ability to access an increasing number of higher density memory devices (e.g. DDR2 and DDR3 DRAMs) at faster and faster access speeds.

Thus, a need still remains for a dynamic back-up storage system with rapid restore, that can positively protect vital system data for as long as necessary. In view of the increasing reliance on computer data structures, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method for operating a dynamic back-up storage system including: providing a high speed memory including a first rank memory device and subsequent ranks of memory devices; providing a non-volatile memory for saving data from the high speed memory; and providing a control logic unit for controlling access, of a central processing unit that executes a program, from the high speed memory including restoring the subsequent ranks of memory devices while the central processing unit is executing the program from the first rank memory device.

The present invention provides a dynamic back-up storage system including: a high speed memory with a first rank memory device and subsequent ranks of memory devices; a non-volatile memory for saving data from the high speed memory; and a control logic unit for controlling access of the high speed memory by a central processing unit includes the first rank memory device accessed before the subsequent ranks of memory devices are restored from the non-volatile memory.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
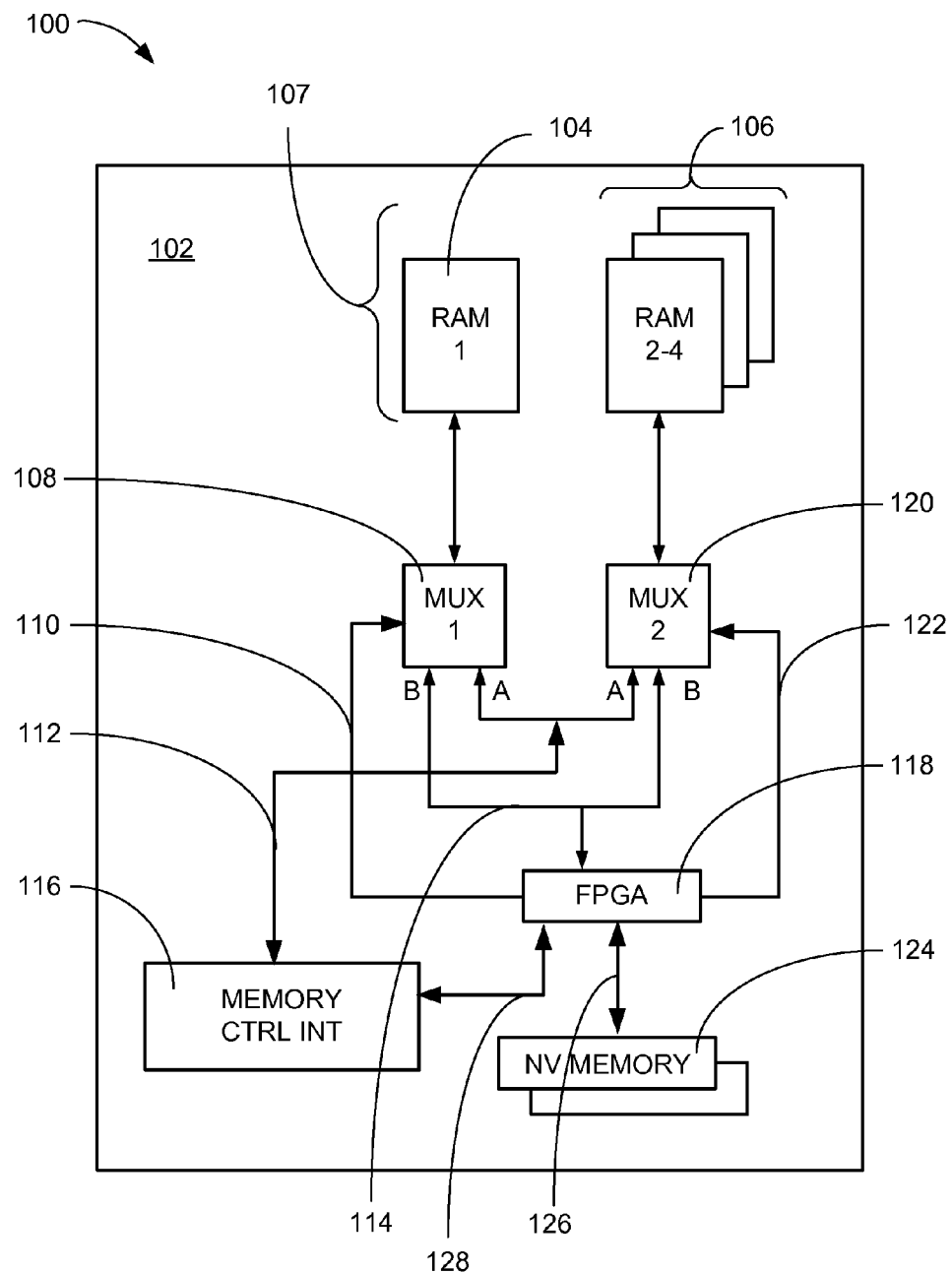
FIG. 1 is a functional block diagram of a dynamic back-up storage system with rapid restore, in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. For expository purposes, the term "horizontal" as used herein is defined as a plane parallel to the plane or surface of the Earth, regardless of its orientation. The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal plane, as shown in the figures. The term "on" means that there is direct contact between elements.

The term "processing" as used herein includes assembling data structures, transferring data structures to peripheral storage devices, manipulating data structures, and reading data structures from external sources. Data structures are defined to be files, input data, system generated data, such as calculated data, and program data.

Referring now to FIG. 1, therein is shown a functional block diagram of a dynamic back-up storage system 100 with rapid restore, in an embodiment of the present invention. The functional block diagram of the dynamic back-up storage system 100 depicts a carrier 102, such as a printed circuit board, having a first rank memory device 104 and subsequent ranks of memory devices 106. The first rank memory device 104 and the subsequent ranks of memory devices 106 may be high speed memory 107, such as random access memory (RAM), that lose data when power is removed.

A first multiplexer 108 may be coupled to the first rank memory device 104. The first multiplexer 108 may provide address and data lines to the first rank memory device 104. It is to be understood that the data lines may be bi-directional and the address lines are unidirectional from the first multiplexer 108. The first multiplexer 108 may have a control line 110 for managing the output of the first multiplexer 108 and selecting between a host interface 112 and a back-up interface 114.

It is understood that the host interface 112 and the back-up interface 114 both have a substantially identical number of address and data lines. The host interface 112 may be sourced from a memory control interface 116, which may include an interface connector (not shown). The back-up interface 114 may be sourced from a control logic unit 118, such as a field programmable gate array (FPGA) or an application specific integrated circuit (ASIC).

A second multiplexer 120 may be coupled to the subsequent ranks of memory devices 106. The subsequent ranks of memory devices 106 may include additional memory devices of equal or different size as compared to the first rank memory device 104. The subsequent ranks of memory devices 106 may include any number of additional memory devices. By way of example, the subsequent ranks of memory devices 106 is shown to include three of the additional memory devices, but any number of the additional memory devices may be coupled to the second multiplexer 120. This is an example only and the subsequent ranks of memory devices 106 may include a different number of the additional memory devices.

A back-up control line 122 may be sourced from the control logic unit 118. The back-up control line 122 may manage the output of the second multiplexer 120 for selecting between the host interface 112 and the back-up interface 114.

A non-volatile memory 124 may include a number of flash memory chips having a sufficient capacity to store all of the data from the first rank memory device 104 and the subsequent ranks of memory devices 106. The non-volatile memory 124 may be coupled to the control logic unit 118 through an NV memory bus 126. The NV memory bus 126 may include data lines as well as address and control lines.

An interface status bus 128 may couple the memory control interface 116 to the control logic unit 118. The interface status bus 128 may convey availability of the first rank memory device 104 and the subsequent ranks of memory devices 106. The interface status bus 128 may also provide early warning for system shut down or other error conditions that may activate a memory back-up process.

It will be understood by those having ordinary skill in the art that the above described hardware may detect system fault conditions in order to initiate a total memory back-up process. During the total memory back-up process the contents of the first rank memory device 104 and the subsequent ranks of memory devices 106 are stored in the non-volatile memory 124.

It has been discovered that during system power-on, the first rank memory device 104 may be restored from the non-volatile memory 124 and presented to the system central processing unit (CPU), not shown, in substantially less time than it takes to restore all of the system memory. By presenting the first rank memory device 104 to the CPU the system may start normal operation while the subsequent ranks of memory devices 106 are restored.

Figure 2:
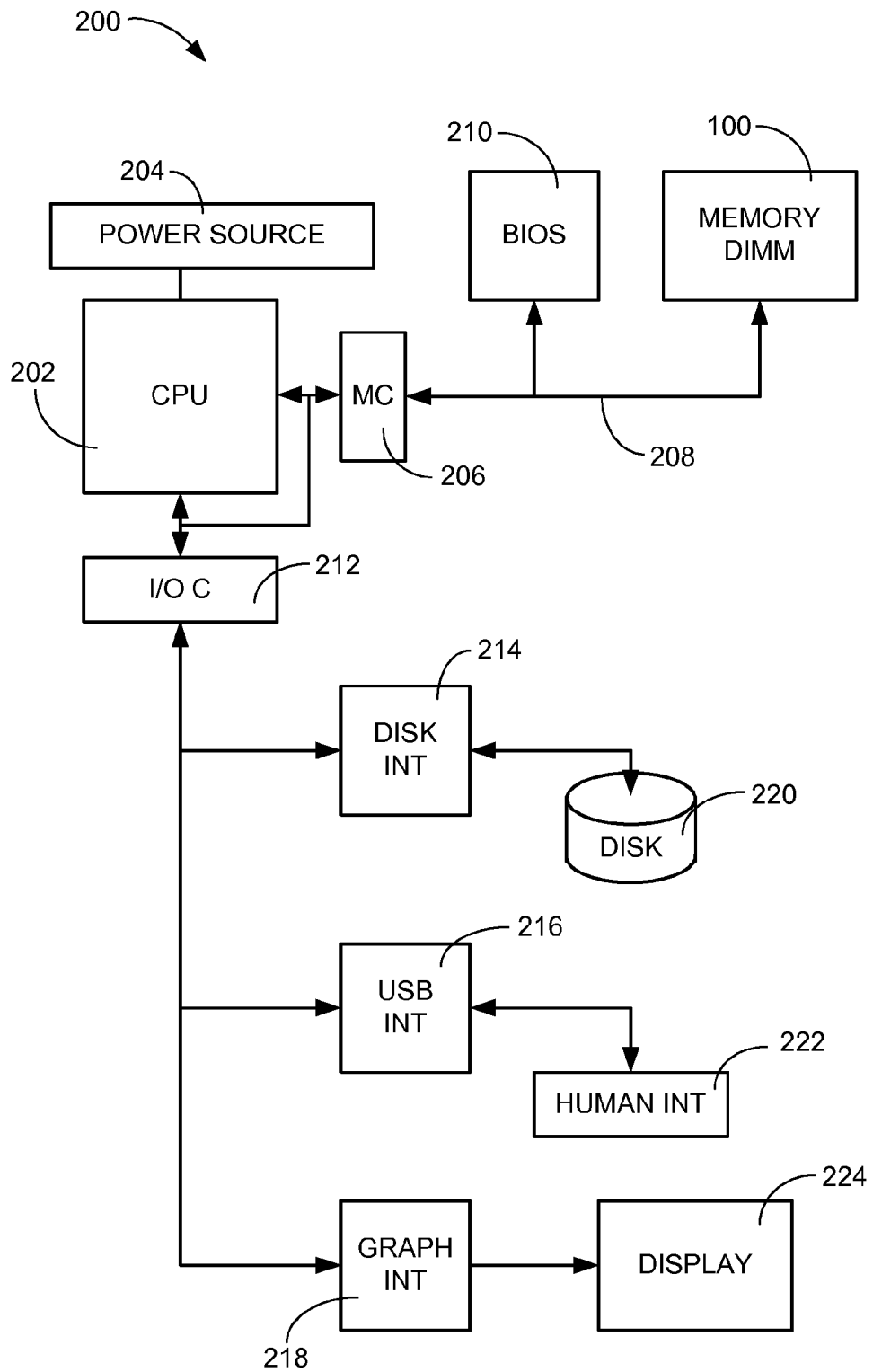
FIG. 2 is a functional block diagram of a computer system with critical data needs.

Referring now to FIG. 2, therein is shown a functional block diagram of a computer system 200 with critical data needs. The functional block diagram of the computer system 200 depicts a central processing unit (CPU) 202 coupled to a power source 204. It is understood that while the power source 204 is shown coupled to the CPU 202 it is also the main source of power for all of the devices shown as part of the computer system 200.

The CPU 202 may be coupled to a memory control chip (MC) 206 which controls a memory bus 208 comprising data and control lines that manage the transfer of data between the dynamic back-up storage system 100, such as a specialized memory DIMM as shown in this example. It is understood that the dynamic back-up storage system 100 may take a different form rather than a memory DIMM without changing its function. It is further understood that the memory control chip 206 may be integrated with the CPU 202 into a single device, which still supports the transfer of data.

A basic input/output system (BIOS) memory 210 may be coupled to the memory bus 208 for initialization of the input/output structure of the CPU 202. The CPU 202 may also be coupled to an input/output controller (I/O C) 212 that manages the peripheral devices that may be used by the CPU 202.

The peripheral devices used by the CPU 202 may include a disk interface controller 214, a universal serial bus (USB) interface controller 216, and a graphics interface controller 218. Other peripheral devices may include a network interface controller (not shown), but it is not required to explain the function of the dynamic back-up storage system 100.

A disk system 220 may be coupled to the disk interface controller 214. The disk system 220 may be comprised of a single disk drive 220 or multiple disk drives 220 configured either individually or as a random array of independent disks (RAID).

The USB interface controller 216 may be coupled to human interface devices 222, such as a keyboard, a mouse or joystick, an audio system or a combination of these and other such devices. The human interface devices 222 may be used to select options to determine what programs are executed by the CPU 202 or to access file systems that may be saved within the disk system 220.

A display 224 may be coupled to the graphics interface controller 218. The display 224 may allow an operator (not shown) to execute selected programs, display data, or monitor progress of operations.

During normal operations the operator may select and activate a program from a list displayed on the display 224. The selected program requires the CPU 202 to locate the selected program on the disk system 220 and transfer it to the dynamic back-up storage system 100 for execution. The CPU would initiate the transfer by initializing the I/O C 212 and the MC 206 to move the data that makes-up the selected program. Once the selected program is loaded in the first rank memory device 104, of FIG. 1, the subsequent ranks of memory devices 106, of FIG. 1, or a combination thereof it may be executed by the CPU 202.

If an unexpected interruption of the power source 204 occurs the dynamic back-up storage system 100 may take the entire content of the first rank memory device 104 and the subsequent ranks of memory devices 106 and save it in the non-volatile memory 124, of FIG. 1, in order to protect the data and the state of execution of the selected program.

When the power source 204 is once again on and stable the dynamic back-up storage system 100 will restore the data to the first rank memory device 104 and the subsequent ranks of memory devices 106 then allow the CPU 202 to resume execution of the selected program from the same operation that was interrupted by the power source 204 removing the power.

It has been discovered that a portion of the high speed memory 107, such as the first rank memory device 104, may be made available to the CPU 202 before all of the memory has been restored. This early availability may shorten the recovery time for the data critical operations performed by the CPU 202. Examples of data critical operations might be plotting real-time traffic patterns for air traffic control, or processing magnetic real-time imaging (MRI) data during an arthroscopic operation. The time saved by restoring the active data for use by the CPU 202 may prevent an accident that may endanger lives.

Figure 3:
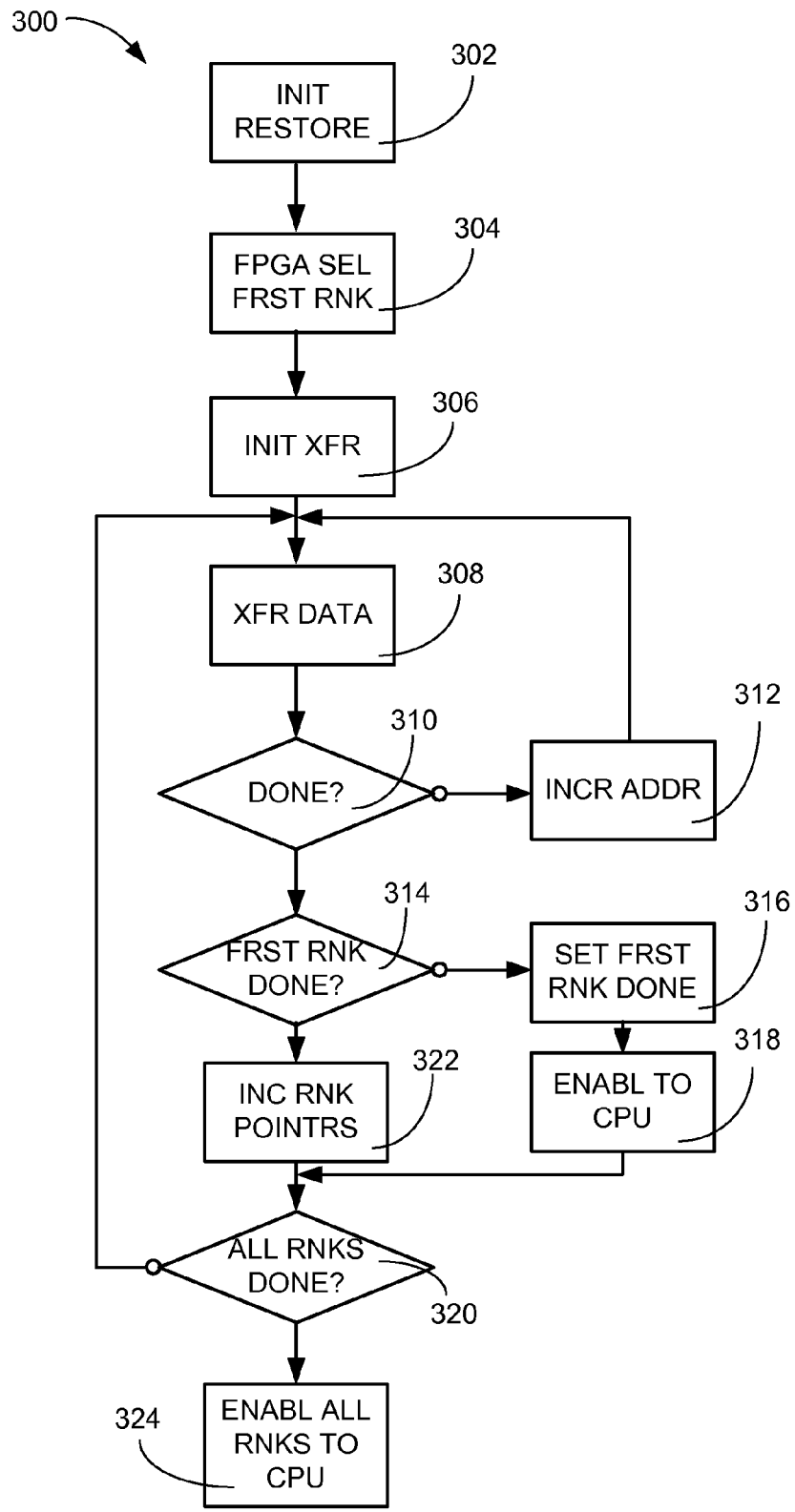
FIG. 3 is an operational flowchart of a restore process of the dynamic back-up storage system as performed by the present invention.

Referring now to FIG. 3, therein is shown an operational flowchart of a restore process 300 of the dynamic back-up storage system 100 as performed by the present invention. The operational flowchart of the restore process 300 depicts an initialize restore block 302, which clears all of the restore flags (not shown) and prepares to copy the stored data back into the first rank memory device 104, of FIG. 1, and the subsequent ranks of memory devices 106, of FIG. 1, for use by the CPU 202, of FIG. 2. During this process the first rank memory device 104 and the subsequent ranks of memory devices 106 are not available to the CPU 202. The CPU 202 may access the BIOS memory 210 in order to initialize the attached peripherals.

The flow proceeds to a select first rank block 304. The first rank memory device 104 is a segment of the entire capacity of the high speed memory 107 that may be restored independently. By way of an example, if the entire accessible memory may have a capacity of 4 GB and the first rank memory device 104 may represent a 1 GB segment of the memory. Also by selecting the first rank memory device 104, any of the subsequent ranks of memory devices 106 are blocked from both the CPU 202 and the internal logic (not shown) within the control logic unit 118, of FIG. 1.

The flow proceeds to an initialize transfer block 306 in order to load the memory segment pointers within the control logic unit 118 in order to properly load the first rank memory device 104 and the subsequent ranks of memory devices 106 with the saved data. In some conditions the first rank memory device 104 and the subsequent ranks of memory devices 106 may remain clear and in an initialized state.

A transfer data block 308 may transfer some amount of data between the non-volatile memory 124, of FIG. 1 and the first rank memory device 104 or the subsequent ranks of memory devices 106. If the first rank memory device 104 and the subsequent ranks of memory devices 106 are to remain initialized, the transfer length may be initialized to zero length, status done set, and all ranks done set. In this condition no data will be transferred and the entire memory may be enabled for use by the CPU 202, of FIG. 2.

A done check 310 is performed as a check of the current rank of memory being filled. If the done check 310 finds that more data must be transferred, the not done branch is taken to an increment addresses block 312. The address within the control logic unit 118 will be incremented in order to address the next line of data within the currently addressed rank of memory. The flow then returns to the entry for the transfer data block 308.

If the done check 310 does indicate that the current rank is completely restored, the flow moves to a first rank done check 314. If the first rank done flag is not set in the control logic unit 118, the flow proceeds to a set first rank done block 316, which activates a first rank done flag within the control logic unit 118 and increments the rank address. The flow then proceeds to an enable to CPU block 318. In this block the first rank memory device 104 is enabled to the CPU 202 for program execution. The subsequent ranks of memory devices 106 are enabled to communicate with the control logic unit 118 in order to continue the memory restore process. When the first rank done flag is first set within the control logic unit 118, the memory controls switch to activate the subsequent ranks of memory devices 106 for access by the control logic unit 118 only.

If the first rank done check 314 finds that the first rank memory device 104 had been restored on a previous iteration, an increment rank pointers block 322 may indicate which of the subsequent ranks of memory devices 106 was just restored. An all ranks done check 320 will determine whether the restore is complete. If the restore of the subsequent ranks of memory devices 106 is not complete the flow will re-enter the transfer data block 308. This loop will continue until all of the memory has been restored with the data that was saved in the non-volatile memory 124.

When the all ranks done 320 detects that indeed all of the ranks have been restored, the flow proceeds to an enable all ranks to CPU block 324. In this block the control logic unit 118 switches control of all of the memory ranks to the CPU 202. From this event onward the CPU 202 may have access to all of the restored data that was available before the power source 204, of FIG. 2, removed the power.

It has been discovered that a time delay between power on and the data available time for the first rank memory device 104 may be reduced to 25-40% of the delay that a prior art back-up memory device can provide. As the maximum addressable memory increases these delays may become on the order of minutes for the prior art solutions. During the power on initialization of the CPU, most if not all of the memory accesses will occur in the first rank memory device. By allowing that access to occur in an earlier timeframe, the rest of the memory may be restored while the CPU 202 prepares for full memory operation. This decrease in operational delay may have a significant impact on real-time applications as previously mentioned.

Figure 4:
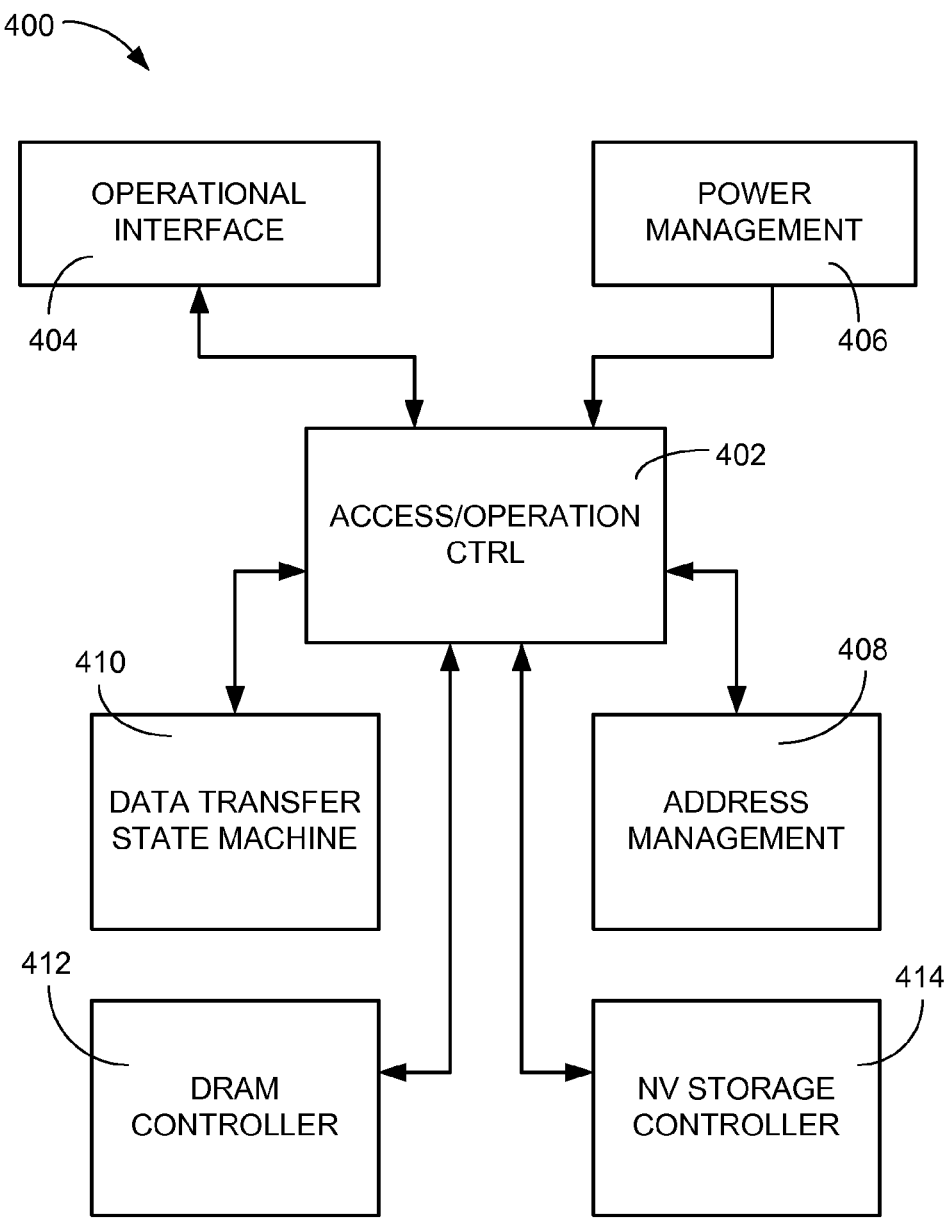
FIG. 4 is a functional block diagram of a control logic unit in an embodiment of the present invention.

Referring now to FIG. 4, therein is shown a functional block diagram of a control logic unit 400 in an embodiment of the present invention. The functional block diagram of the control logic unit 400 depicts an access/operational control block 402, which may contain the logic required to shorten the restore time delay as experienced by the CPU 202, of FIG. 2. The access/operational control block 402 may include control logic and state machines that manage the operation of the back-up and restore of the data in the first rank memory device 104, of FIG. 1, and the subsequent ranks of memory devices 106, of FIG. 1.

An operational interface 404 may be coupled to the access/operational control block 402. The operational interface 404 may include status and control lines (not shown) for signaling the availability of the first rank memory device 104 and the subsequent ranks of memory devices 106 to the CPU 202 as well as operating the first multiplexer 108, of FIG. 1, and the second multiplexer 120, of FIG. 1.

A power management block 406 may detect the interruption of power and supply a residual power source (not shown) in order to save the data from the first rank memory device 104 and the subsequent ranks of memory devices 106. The access/operational control block 402 may receive the notification of the interruption of power and proceed to save the data from the first rank memory device 104 and the subsequent ranks of memory devices 106 in the non-volatile memory 124, of FIG. 1.

The access/operational control block 402 may rely on an address management block 408 to manage the source addresses for the first rank memory device 104 and the subsequent ranks of memory devices 106 as well as the non-volatile memory 124 throughout the back-up process. A data transfer state machine 410 controls the data movement between the first rank memory device 104 and the subsequent ranks of memory devices 106 including managing the first multiplexer 108 and the second multiplexer 120.

A dynamic random access memory controller 412 may control the interface timing for the first rank memory device 104 and the subsequent ranks of memory devices 106 as well as any required refresh timing. A non-volatile storage controller 414 may manage the interface timing requirements for the non-volatile memory 124.

The above description of the control logic unit 400 is an example only and other patricians are possible. The primary function of the control logic unit 400 is to provide a data back-up and restore controller that provides a fast release for providing access to the first rank memory device before the entire memory has been restored.

Figure 5:
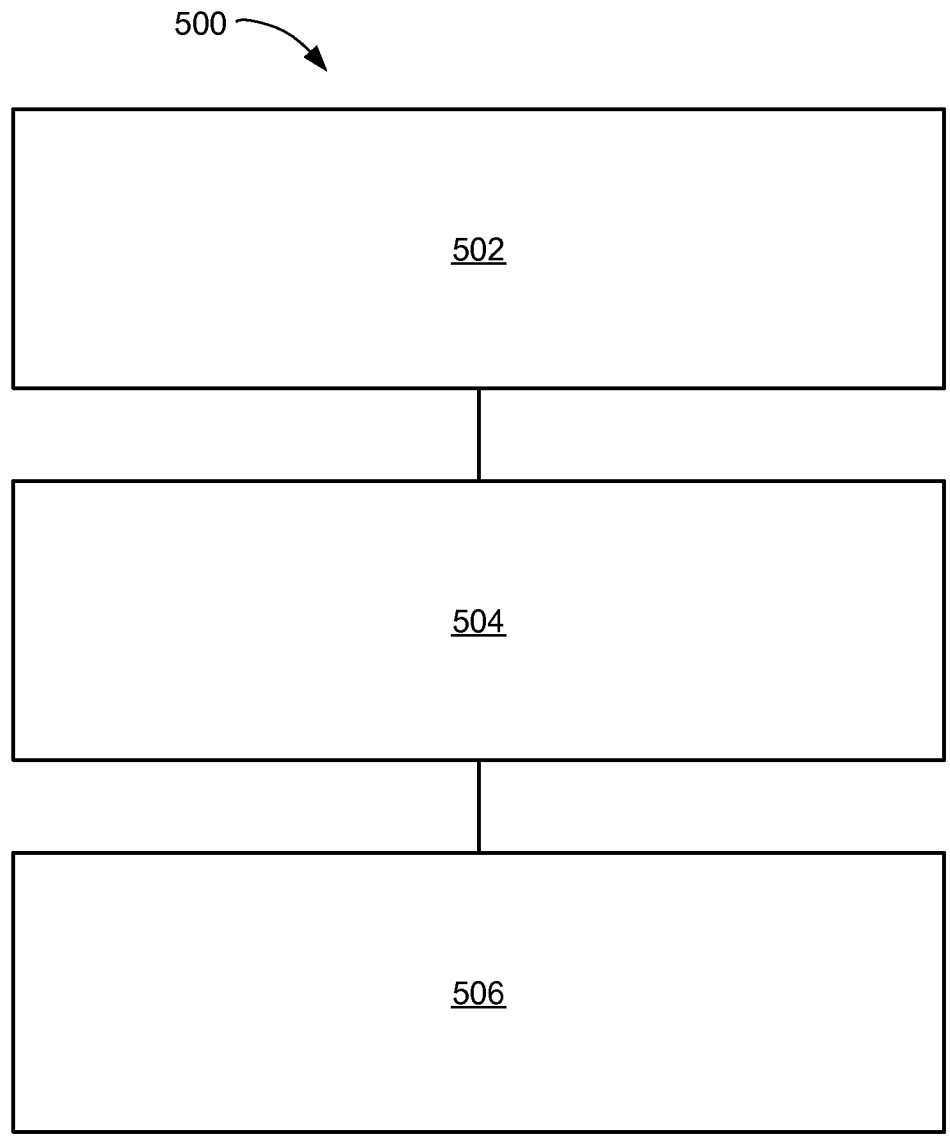
FIG. 5 is a flow chart of a method of operation of dynamic back-up storage system in an embodiment of the present invention.

Referring now to FIG. 5, therein is shown a flow chart of a method 500 of operation of dynamic back-up storage system in an embodiment of the present invention. The method 500 includes: providing a high speed memory including a first rank memory device and subsequent ranks of memory devices in a block 502; providing a non-volatile memory for saving data from the high speed memory in a block 504; and providing a control logic unit for controlling access, of a central processing unit that executes a program, from the high speed memory including restoring the subsequent ranks of memory devices while the central processing unit is executing the program from the first rank memory device in a block 506.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method for operating a dynamic back-up storage system comprising:
   providing a high speed memory including a first rank memory device and subsequent ranks of memory devices;
   providing a non-volatile memory for saving data from the high speed memory; and
   providing a control logic unit for controlling access, of a central processing unit that executes a program, from the high speed memory including restoring the data in the subsequent ranks of memory devices while the central processing unit is executing the program from the first rank memory device.

2. The method as claimed in claim 1 further comprising providing a first multiplexer for accessing the first rank memory device.

3. The method as claimed in claim 1 further comprising:
   providing an access/operational control block in the control logic unit for accessing the high speed memory by the central processing unit; and
   providing an operational interface for blocking the subsequent ranks of memory devices from the central processing unit.

4. The method as claimed in claim 1 wherein:
   providing the control logic unit for controlling access from the high speed memory includes providing a data transfer state machine for managing data timing; and
   further comprising:
   providing an address management block for moving the data between the non-volatile memory and the high speed memory.

5. The method as claimed in claim 1 further comprising providing a memory control interface for addressing the high speed memory by the central processing unit.

6. A method for operating a dynamic back-up storage system comprising:
   providing a power management block for detecting a power interrupt;

providing a high speed memory including a first rank memory device and subsequent ranks of memory devices;

providing a non-volatile memory for saving data from the high speed memory when the power interrupt is detected; and providing a control logic unit for controlling access, of a central processing unit that executes a program, from the high speed memory including restoring the data in the subsequent ranks of memory devices while the central processing unit is executing the program from the first rank memory device.

7. The method as claimed in claim 6 further comprising providing a first multiplexer for accessing the first rank memory device and a second multiplexer for accessing the subsequent ranks of memory devices.

8. The method as claimed in claim 6 further comprising:
providing an access/operational control block in the control logic unit for accessing the high speed memory by the central processing unit including transferring data from the first rank memory device to the central processing unit while the control logic unit continues restoring the subsequent ranks of memory devices;
providing a memory control interface for blocking the subsequent ranks of memory devices from the central processing unit; and
providing an operational interface in the control logic unit for managing a first multiplexer and a second multiplexer when moving data between the non-volatile memory, the first rank memory device and the subsequent ranks of memory devices.

9. The method as claimed in claim 6 wherein:
providing the control logic unit for controlling access from the high speed memory includes providing a data transfer state machine for managing data timing between the non-volatile memory and the high speed memory; and
further comprising:
providing an operational interface for allowing access of the first rank memory device while the subsequent ranks of memory devices are being restored; and
providing an access/operational control block for managing data moving between the first rank memory device, the subsequent ranks of memory devices, the non-volatile memory, or a combination thereof.

10. The method as claimed in claim 6 further comprising providing a memory control interface for addressing the high speed memory by the central processing unit including blocking the subsequent ranks of memory devices when the control logic unit is restoring the subsequent ranks of memory devices.

11. A dynamic back-up storage system comprising:
a high speed memory includes a first rank memory device and subsequent ranks of memory devices;
a non-volatile memory for saving data from the high speed memory; and
a control logic unit for controlling access, of a central processing unit that executes a program, from the high speed memory including restoring the data in the subsequent ranks of memory devices while the central processing unit is executing the program from the first rank memory device.

12. The system as claimed in claim 11 further comprising a first multiplexer coupled to the first rank memory device and not coupled to the subsequent ranks of memory devices.

13. The system as claimed in claim 11 further comprising:
a memory control interface for accessing the high speed memory by the central processing unit; and
an operational interface, in the control logic unit, for blocking the subsequent ranks of memory devices from the central processing unit.

14. The system as claimed in claim 11 further comprising:
a data transfer state machine for managing data timing between the non-volatile memory and the high speed memory; and
an address management block for moving the data between the non-volatile memory and the high speed memory.

15. The system as claimed in claim 11 further comprising a memory control interface for addressing the high speed memory by the central processing unit.

16. The system as claimed in claim 11 further comprising a power management block for detecting a power interrupt.

17. The system as claimed in claim 16 further comprising a first multiplexer coupled to the first rank memory device and a second multiplexer coupled to the subsequent ranks of memory devices.

18. The system as claimed in claim 16 further comprising:
a memory control interface for accessing the high speed memory by the central processing unit;
a control logic unit for blocking the subsequent ranks of memory devices from the central processing unit; and
an access/operational control block in the control logic unit for transferring data between the first rank memory device and the non-volatile memory.

19. The system as claimed in claim 16 further comprising:
a data transfer state machine, in the control logic unit, for managing data timing between the non-volatile memory and the high speed memory;
an operational interface for allowing access of the first rank memory device when the subsequent ranks of memory devices is not available; and
an access/operational control block for managing data moved between the first rank memory device, the subsequent ranks of memory devices, the non-volatile memory, or a combination thereof.

20. The system as claimed in claim 16 further comprising a memory control interface for blocking the subsequent ranks of memory devices from the central processing unit and allowing the subsequent ranks of memory devices to be accessed by the control logic unit.

* * * * *